United States Patent
Sipilä

(10) Patent No.: US 7,269,226 B2
(45) Date of Patent: Sep. 11, 2007

(54) DATA PROCESSING METHOD

(75) Inventor: Teemu Sipilä, Oulunsalo (FI)

(73) Assignee: Nokia Corporation, Espoo (FI)

( * ) Notice: Subject to any disclaimer, the term of this patent is extended or adjusted under 35 U.S.C. 154(b) by 940 days.

(21) Appl. No.: 10/010,429

(22) Filed: Dec. 3, 2001

(65) Prior Publication Data

US 2002/0118778 A1    Aug. 29, 2002

(30) Foreign Application Priority Data

Dec. 8, 2000    (FI)    ................................. 20002692

(51) Int. Cl.
- H04L 5/12    (2006.01)
- H04L 27/06    (2006.01)
- G06F 11/00    (2006.01)
- H03M 13/00    (2006.01)

(52) U.S. Cl. ...................... 375/262; 375/265; 375/341; 375/240.27; 714/746; 714/799

(58) Field of Classification Search ................. 375/341, 375/340
See application file for complete search history.

(56) References Cited

U.S. PATENT DOCUMENTS

| | | | | |
|---|---|---|---|---|
| 5,371,471 A | * | 12/1994 | Chennakeshu et al. | ..... 329/304 |
| 5,537,443 A | * | 7/1996 | Yoshino et al. | ............. 375/340 |
| 5,687,198 A | | 11/1997 | Sexton et al. | ................ 375/347 |
| 5,872,816 A | * | 2/1999 | Parr et al. | .................... 375/341 |
| 5,907,586 A | * | 5/1999 | Katsuragawa et al. | ...... 375/341 |
| 6,556,632 B1 | * | 4/2003 | Kubo et al. | .................. 375/341 |
| 6,674,820 B1 | * | 1/2004 | Hui et al. | .................... 375/346 |
| 6,754,263 B1 | * | 6/2004 | Kakura | ........................ 375/232 |
| 2003/0081702 A1 | * | 5/2003 | Kubo et al. | .................. 375/341 |

FOREIGN PATENT DOCUMENTS

| | | |
|---|---|---|
| EP | 0 935 372 A | 8/1999 |
| WO | WO92/11708 A | 7/1992 |
| WO | WO98/43360 | 10/1998 |

OTHER PUBLICATIONS

"Digital Communications", Lee et al., pp. 268-275.
Tap Selectable Viterbi Equalization In Spatial And temporal Domains For Multipath Channel, Ishii N. et. al., Nov. 6, 1995, pp. 904-908.

* cited by examiner

Primary Examiner—David C Payne
Assistant Examiner—Linda Wong
(74) Attorney, Agent, or Firm—Perman & Green, LLP

(57) ABSTRACT

A suboptimal method for searching for a symbol sequence, the method comprising the steps of: determining a channel impulse response; sampling a received signal; selecting at least one of the highest and/or most reliable impulse response values; determining a reference signal using at least one impulse response value and a symbol sequence assumed as transmitted; determining differential terms corresponding to the selected impulse response values for the signal sample and the reference signal; using the determined differential terms in a transition metric for searching for a symbol sequence; forming a survivor path by adding the symbol sequence provided by the transition metric to the survivor path formed so far.

34 Claims, 4 Drawing Sheets

Fig. 4B
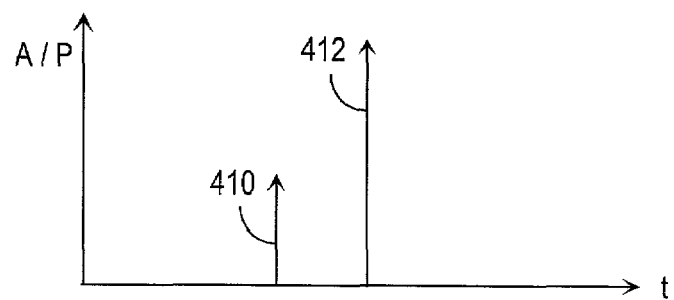
Fig. 4C
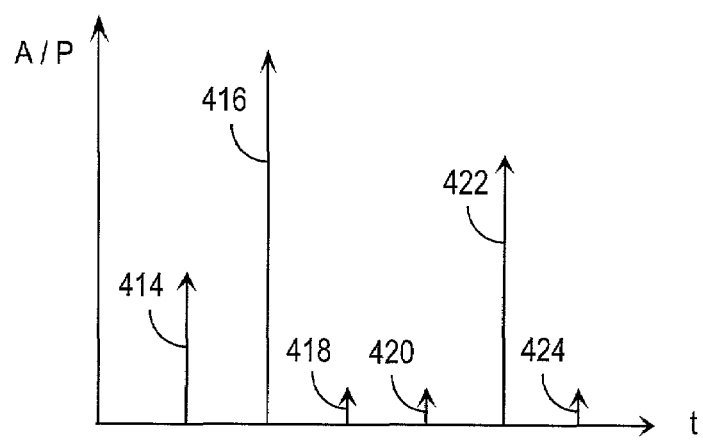
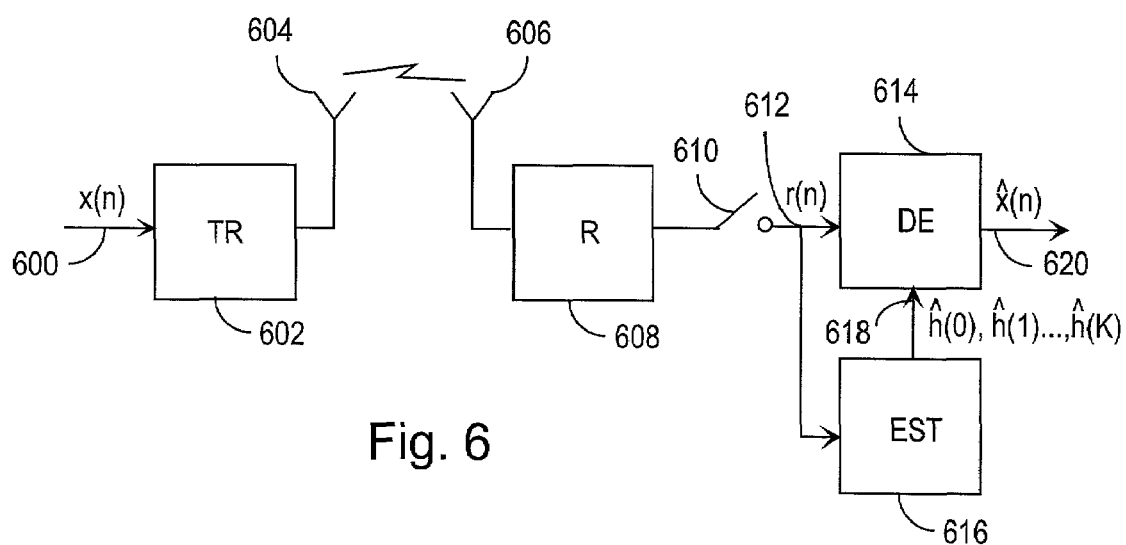
Fig. 6

DATA PROCESSING METHOD

FIELD OF THE INVENTION

The invention relates to a method for searching for symbol sequences by applying a path metric for example for decoding a received symbol or for reducing intersymbol interference (ISI) in a receiver.

BACKGROUND OF THE INVENTION

In radio communication systems, signals propagate from the transmitter to the receiver in the form of electromagnetic waves in a radio channel. A signal transmitted in the radio channel is affected by different kinds of distortions and therefore the received signal deviates from the one transmitted. Despite the distortion, the transmitted information has to be detected in the receiver. Various methods have been developed to ensure successful signal detection, for example search methods, or algorithms, based on diverse diagrams, such as trellis diagrams or tree diagrams. These algorithms are used in an attempt to find the path, i.e. symbol sequence (a symbol sequence comprising at least one bit), leading through the diagram in which the path metric is the smallest, the path metric being typically the sum of the Hamming weights or the squared Euclidean distances of different state transitions; in other words, they are based on the Viterbi algorithm. The Viterbi algorithm is extremely complex and therefore slow, which is why it is usually not suitable as such for practical applications. The algorithms referred to are suboptimal: they are many and they are applicable to different purposes of use. They are used for example in channel equalizers, for decoding signals coded in various ways, in speech recognition, and in multi-user detectors (MUD). Examples of the algorithms include M-algorithm, Fano algorithm, decision-feedback sequence estimation (DFSE), which are all hard decision algorithms. Soft decision algorithms include soft decision DFSE and a soft decision M-algorithm.

However, if the first value of a channel impulse response is not the highest value, prior art algorithms function deficiently. In previous attempts to solve this problem, a prefilter is arranged in front of the channel equalizer to concentrate the received signal's energy at the beginning of the impulse response. The prefilter, however, increases the complexity of the system and lengthens the time needed for processing the signal. There are situations where even the prefilter does not manage to provide enough power for the first impulse response value. In addition, if the first impulse response value used for determining the channel impulse response is unreliable or too low, the reliability of sequence estimation is impaired.

BRIEF DESCRIPTION OF THE INVENTION

It is an object of the invention to provide an improved suboptimal method based on the Viterbi algorithm for searching for a symbol sequence typically in a receiver.

This is achieved with a suboptimal method for searching for a symbol sequence, the method comprising the steps of: determining a channel impulse response, sampling a received signal, selecting at least one of the highest and/or most reliable impulse response values, determining a reference signal using the at least one impulse response value and a symbol sequence assumed as transmitted, determining differential terms corresponding to the selected impulse response values for the signal sample and the reference signal, applying the determined differential terms to a symbol sequence transition metric for searching for a symbol sequence, forming a survivor path by adding the symbol sequence provided by the transition metric to the survivor path formed so far.

The invention further relates to a receiver implementing the method, in which receiver a symbol sequence is searched for. The receiver comprises means for determining a channel impulse response; means for sampling a received signal; means for selecting at least one of the highest and/or most reliable impulse response values; means for determining a reference signal using the at least one impulse response value and a symbol sequence assumed as transmitted; means for determining differential terms corresponding to the selected impulse response values for the signal sample and the reference signal; means for using the determined differential terms in a transition metric for searching for a symbol sequence; means for forming a survivor path by adding the symbol sequence provided by the transition metric to the survivor path formed so far.

The preferred embodiments of the invention are disclosed in the dependent claims, The invention is based on the idea that the transition metric is adapted to the estimated channel impulse response so that the terms of the transition metric, or some of them, correspond to the selected highest and/or most reliable impulse response values. In addition, the reference signals needed for determining the terms can also be calculated using only some of the determined impulse response values, preferably the impulse response value used together with the corresponding sample signal to calculate the differential term, or later impulse response values, or some of them.

The method and system of the invention provide various advantages. The method of the invention allow to improve the reliability of suboptimal algorithms based on the Viterbi algorithm, particularly in cases where signal energy in the channel impulse response is not concentrated at the beginning of the impulse response, the method thereby eliminating the need for separate prefilters. In addition, if the measurement or other estimation used for determining the channel impulse response fails, for example one of the impulse response values provided is unreliable, the method allows the differential term corresponding to the impulse response value concerned to be replaced in the symbol sequence transition metric by a differential term corresponding to some other value, which increases the reliability of the symbol sequence estimation.

BRIEF DESCRIPTION OF THE DRAWINGS

In the following the invention will be described in greater detail in connection with preferred embodiments and with reference to the accompanying drawings, in which

FIGS. 4a-c illustrate examples of a channel impulse response;

FIG. 6 is a block diagram illustrating an example of a receiver structure.

DESCRIPTION OF THE EMBODIMENTS

The present invention can be used in diverse wireless communication system, such as cellular radio systems. The multiple access method to be used is not relevant. For example, CDMA (Code Division Multiple Access), WCDMA (Wideband Code Division Multiple Access) and TDMA (Time Division Multiple Access), or their hybrids, may be used. It is also apparent to a person skilled in the art that the method of the invention can also be applied to systems employing different modulation methods or air interface standards. The method of the invention is particularly suitable for systems employing multi-layer modulation methods, such as the EDGE system (enhanced data rates for GSM evolution), which is a modification of the GSM system (Groupe Special Mobile) and which employs 8-PSK modulation.

Figure 1:
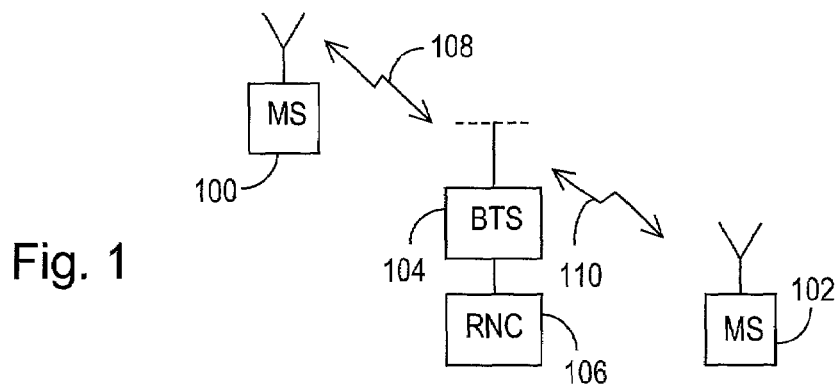
FIG. 1 shows an example of a telecommunications system.

FIG. 1 illustrates schematically a digital data transfer system in which the solution of the invention can be applied. It is a part of a cellular radio system comprising a base station 104 having a radio connection 108 and 110 to subscriber terminals 100 and 102, which may be fixedly mounted, vehicle-mounted or portable terminals. The base station comprises transceivers, which are connected to an antenna unit that provides a radio connection to the subscriber terminal. The base station further communicates with a base station controller 106, which forwards the terminals' connections in the network. The base station controller controls in a centralized manner a plural number of base stations connected to it. The base station controller comprises a control unit responsible for call control, mobility management, collection of statistical information and signalling.

The public switched telephone network can also be contacted from the cellular radio system.

Figure 2A:
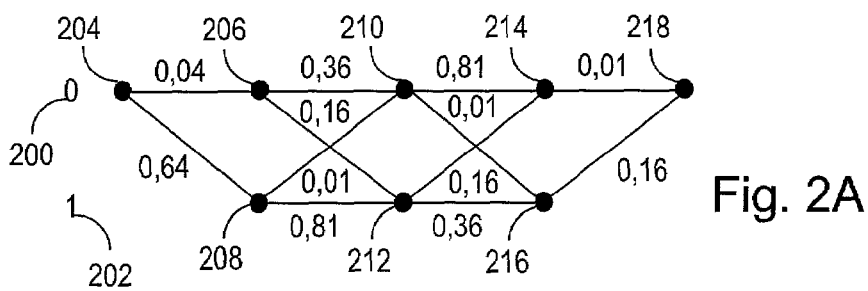
FIGS. 2a-c illustrate an example of a trellis diagram.
Figure 2B:
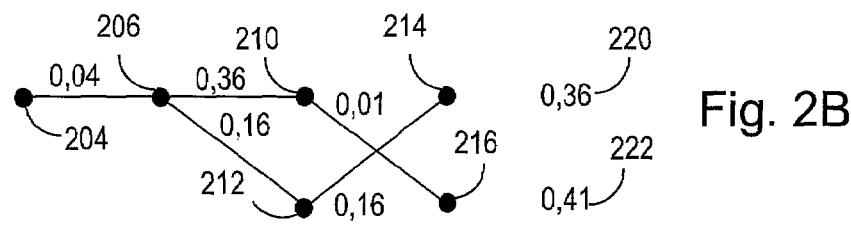
Figure 2C:
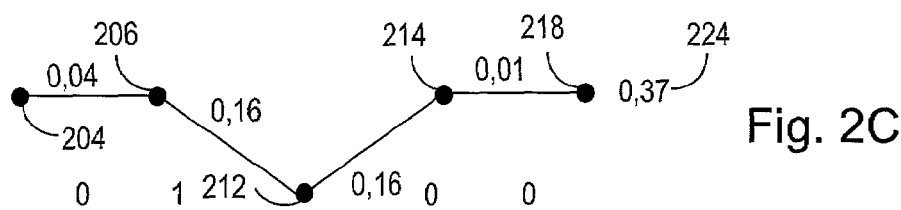

FIGS. 2a-c show a schematic example of trellis diagrams. The example shown in FIGS. 2a-c only serves to illustrate the basic principles of the Viterbi algorithm and does not restrict the application of the invention in any way. The example is taken from Edward A. Lee, David G. Messerschmitt: *Digital Communications*, pp. 268-275, incorporated herein as a reference.

A received signal has been sampled and, thereby, samples having values 0.2, 0.6, 0.9 and 0.1 have been obtained. The samples typically represent the power values of the received signal. At this stage the received signal is thus a discrete analog signal. The modulation method used in the system and thus the symbol sequences sent by the transmitter are known. The example of FIGS. 2a-c shows the simplest case possible in which there are only two levels: 0 200 and 1 202. The levels could also be +1 or −1 levels, or there could be more of them, and the levels could comprise a plural number of bits. In 8-PSK modulation, for example, there are eight levels, each consisting of symbol sequences of three bits. The states in the diagram, i.e. the symbol sequences possibly transmitted, are one below the other and time is read from left to right. In the example in question, the channel impulse response is estimated to take the following form: $h_k = \delta_k + 0,5 \cdot \delta_{k|1}$, i.e. at the time of observation, the system output depends not only on the input at the time of observation, but also on the input at a previous time instant. The reference values used in the metric are therefore those shown in Table 1

TABLE 1

| $\delta_k$ | $\delta_{k-1}$ | metric reference value |
|---|---|---|
| 0 | 0 | 0,0 |
| 0 | 1 | 0,5 |
| 1 | 0 | 1,0 |
| 1 | 1 | 1,5 |

In the following, the searching for the symbol sequence will be described with reference to FIG. 2a in a situation where the transition metrics are determined on the basis of the squared Euclidean distances. In this example, the received signal is processed as a discrete analog signal. The trellis starts from 0-state. The first observation is 0.2, the squared Euclidean distance being obtained by $|0.2-0|^2$ which produces 0.04, which is thus the first transition metric value. Similarly, $|0.2-1|^2$ is calculated to obtain 0.64.

The next observation is 0.6, calculation from 0-state to 0-state being performed by $|0.6-0|^2$, the value of which is 0.36, and from 0-state to 1-state by $|0.6-1|^2$, the result being 0.16. Calculation from 1-state to 0-state, in turn, is performed by $|0.6-0.5|^2$, the value of which is 0.01 and transition from 1-state to 1-state is calculated by $|0.6-1.5|^2$ to obtain 0.81.

The calculation is continued similarly until the end of the trellis is reached and all transition metrics have been found.

In FIG. 2b the search is expedited by using the Viterbi algorithm. According to the Viterbi algorithm, the path to be selected is decided on in every state 204, 206, 208, 210, 212, 214, 216, 218. The selection is made on the basis of the path metrics 220, 222. In path metric, the transition metrics of each path are summed at every state. According to the Viterbi algorithm, the path with the smaller path metric is selected from the two paths entering each decision state. This allows error probability to be minimized. The path selected in each decision state is called a survivor. Consequently, only one path per state is stored in the memory. The selected sequences are added to the previous sequences. FIG. 2b shows the survivors only, the first one of which has a path metric that is the sum of the transition metrics, i.e. 0.04+0.16+0.16=0.36220, the path metric of the other one being 0.04+0.36+0.01=0.41222.

FIG. 2c illustrates the decision to be taken with regard to the symbol sequence that was sent. When the symbol sequences join at the end of the trellis diagram, final decisions with regard to the received symbols are taken. The path with the smallest path metric, in this case 0.37224, is selected among the survivor paths, the symbol sequence assumed as transmitted thus being 0,1,0,0. It is to be noted that the complexity of the Viterbi algorithm grows exponentially as the impact length (memory length) increases and linearly in relation to the number of the states.

There are also other methods for calculating the transition metrics than the squared Euclidean metric used in the above example, such as the Hamming metric, correlation metric and probability metric. In the Hamming metric, for example, the received signal is processed as symbol sequences, i.e. in a digital format.

Figure 3:
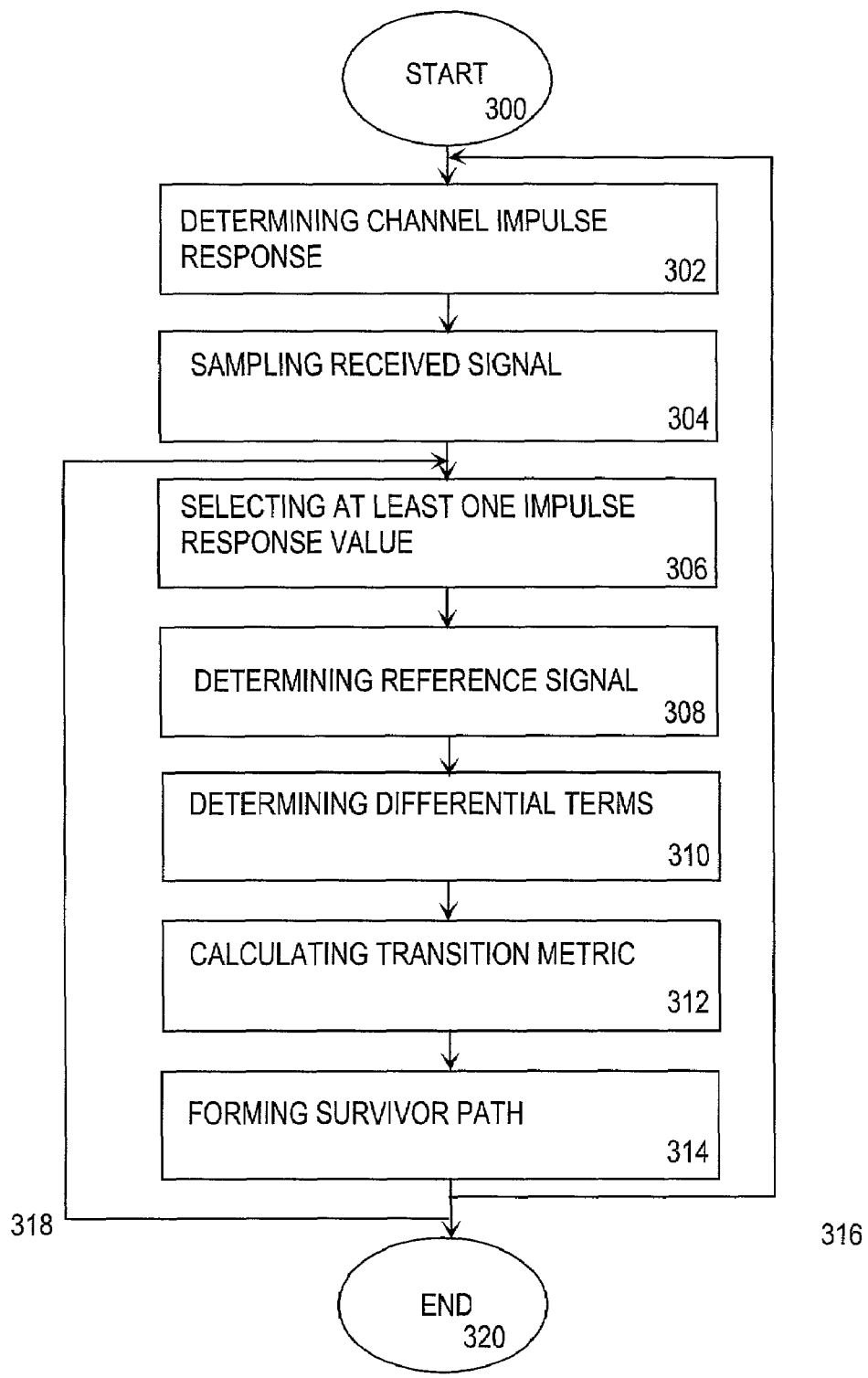
FIG. 3 is a flow diagram illustrating the method steps for searching for a symbol sequence.

FIG. 3 is a flow diagram illustrating the method steps for searching for a symbol sequence. The execution of the method starts at block 300. In block 302 a channel impulse response is determined by measuring the power of the received signal at different delay values. The impulse response can also be estimated using prior art methods, which are not described in greater detail herein. The number of the impulse response values to be determined depends on the system, for example on the number of filter coefficients, and, from the point of view of applying the method, it can be freely selected.

In block 304 the received signal is sampled using a prior art method to obtain observation values for the transition metric.

Next, in block 306, one or more impulse response values are selected for the transition metric. By using several values, a more reliable result is obtained. The values selected for use among the impulse response values are either the highest values, which allows the received signal energy to be maximized, or the selection is made taking into account the reliability of the value as well, for example by selecting perhaps a weaker impulse response value, if it is a very reliable one, and leaving out a value which is high but unreliable. The selection can be made, as shown above, on the basis of a combined selection criterion or on the basis of value or reliability alone. The selection criterion suitable for each situation may be adopted. For example, reliability is emphasized, if prior information obtained from the system has shown it to provide the best result.

In block 308 the comparison or reference signal used in the transition metric of the symbol sequence is determined by applying at least one impulse response value determined in block 302 and the symbol sequence assumed as transmitted. The reference signal takes for example the following form:

$$\sum_{k=0}^{K} h(f(k))x(n-k), \text{ where} \quad (1)$$

K is the length of the system memory;

h(f(k)) is the value of the impulse response. According to the formula, the number of the impulse response values is determined on the basis of the length of the system memory and, from the point of view of executing the method, it may be freely selected;

f(k) is a function of k. The expression illustrates that the calculation to determine the reference signal may include either all the impulse response values stored in the memory or only some of them. The calculation is preferably carried out using the impulse response value selected for the transition metric and later impulse response values, or some of them;

x(n) is the symbol sequence assumed as transmitted, the number of the sequences being also determined, according to the formula, on the basis of the length of the system memory and, from the point of view of executing the method, the number may be freely selected.

The symbol sequences assumed as transmitted are those transmitted by the transmitter. Their length (the number of bits per symbol) and the number of different symbol sequences depends on the system employed, particularly on the method of modulation, and, from the point of view of the improved search method, they may be freely selected.

In block 310 are determined differential terms. They are determined as a squared Euclidean distance, for example, by using samples of received signals corresponding to the impulse response values selected in block 306 and reference signals. The differential term is calculated for example as follows:

$$\left| r(n) - \sum_{k=0}^{K} h(f(k))x(n-k) \right|^2, \text{ where} \quad (2)$$

K is the length of the system memory;

h(f(k)) is the value of the impulse response;

f(k) is a function of k to describe that calculation of the reference signals needed for determining the differential terms may also be carried out using only some of all the determined impulse response values, particularly the impulse response value selected in block 306 and later impulse response values, or some of them;

x(n) is the symbol sequence assumed as transmitted;

r(n) is the sample obtained from the received signal.

Differential terms are calculated for the signal samples taken from the received signal and corresponding to the selected impulse response values.

In addition to the Euclidean metric shown in the example, other possible differential term metrics include for example the Hamming metric, correlation metric and probability metric.

In block 312 is calculated the transition metric for the symbol sequence.

According to the method, only some of all possible differential terms are selected to be used in the transition metric, for example the differential terms corresponding to the selected impulse response values calculated in block 310. This allows a transition metric conforming to the improved search method to be obtained. According to another embodiment, the transition metric is determined as in the prior art, differential terms corresponding to the selected impulse response values being then added to the transition metric, which also allows a transition metric according the improved search metric to be obtained. The maximum number of differential terms possible for the transition metric is determined by the length of the channel memory, i.e. the maximum number of impulse response values available. In the following, the selection of the transition metric terms will be described in greater detail with reference to the channel impulse response examples of FIGS. 4a-c. The examples are described only to facilitate the understanding of the invention, and they do not in any way restrict the application of the improved search method. The horizontal axis in FIGS. 4a-c represents time and the vertical axis amplitude or power.

Figure 4A:
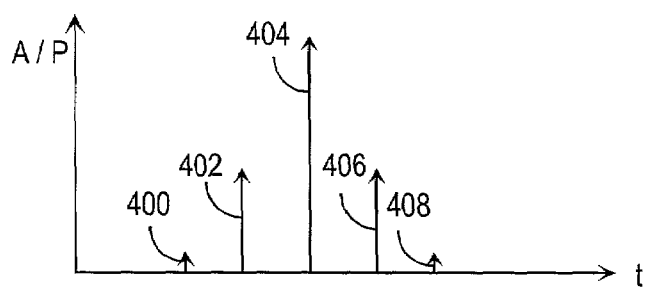

FIG. 4a shows a channel impulse response in which the highest value is on the third impulse response tap. In this case three terms, for example, are selected for the transition metric, i.e. sample h(n) 400 representing the time of observation and two previous samples h(n+1) 402 and h(n+2) 404, samples h(n+3) 406 and h(n+4) 408 being left out, the transition metric according to the improved search method thus preferably taking the following form:

$$\left| r(n) - \sum_{k=0}^{4} h(k)x(n-k) \right|^2 + \left| r(n+1) - \sum_{k=1}^{4} h(k)x(n+1-k) \right|^2 + \quad (3)$$

$$\left| r(n+2) - \sum_{k=2}^{4} h(k)x(n+2-k) \right|^2$$

where $$\left|r(n) - \sum_{k=0}^{4} h(k)x(n-k)\right|^2$$

corresponds to a prior art solution,
additional terms $$\left|r(n+1) - \sum_{k=1}^{4} h(k)x(n+1-k)\right|^2 \text{ and } \left|r(n+2) - \sum_{k=2}^{4} h(k)x(n+2-k)\right|^2$$

being here referred to as additional transition metric terms.

The example of formula 3 shows that in the additional transition metric terms of the improved search metric, the reference signal for the differential term may be determined using only some impulse response values. In that case, the selected impulse response value and later impulse response values, or some of them, are preferably taken into account.

FIG. 4b shows another channel example, the impulse response of which comprises two power taps h(n) 410 and h(n+1) 412. The prior art transition metric thus takes the following form:

$$|r(n) - h(0)x(n) - h(1)x(n-1)|^2 \quad (4)$$

The transition metric according to the improved search method in turn takes for example the following form:

$$|r(n) - h(1)x(n-1)|^2 + |r(n+1) - h(1)x(n)|^2 \quad (5)$$

In the example of FIG. 4c, the channel impulse response comprises two high values: h(n+1) 416 and h(n+4) 422. In addition to these, h(n) 414 is included in the transition metric. Impulse response values 418, 420 and 424 are left out of the metric. The prior art squared Euclidean transition metric thus takes the following form:

$$\left|r(n) - \sum_{k=0}^{5} h(k)x(n-k)\right|^2 \quad (6)$$

and the Hamming transition metric the form $$d_H\left(Q[r(n)], Q\left[\sum_{k=0}^{5} h(k)x(n-k)\right]\right), \text{ where} \quad (7)$$

Q[a] is variable a which is quantized to represent a predetermined number of symbols,
$d_H(b, c)$ is the Hamming distance between numbers b and c.

The squared Euclidean transition metric of the improved search method in turn takes for example the following form:

$$\left|r(n) - \sum_{k=0}^{5} h(k)x(n-k)\right|^2 + \quad (8)$$
$$|r(n+1) - h(1)x(n) - h(4)n(n-3)|^2 + |r(n+4) - h(4)x(n)|^2$$

and the Hamming transition metric of the improved search method for example the form $$d_H\left(Q[r(n)], Q\left[\sum_{k=0}^{5} h(k)x(n-k)\right]\right) + \quad (9)$$
$$d_H(Q[r(n+1)], Q[h(1)x(n) + h(4)x(n-3)]) +$$
$$d_H(Q[r(n+4)], Q[h(4)x(n)])$$

In other words, one embodiment of the improved search method provides a transition metric in which differential terms may be determined only for selected impulse response values and signal samples. In another embodiment, the transition metric is determined according to the prior art, differential terms, referred to as additional transition metric terms in this context, corresponding to the selected impulse response values being added to this transition metric. Moreover, the calculation of reference signals needed for determining the additional transition metric terms or other differential terms according to the improved search method may be carried out using only some of all determined impulse response values, preferably the impulse response value the sample signal corresponding to which is used for calculating the differential term and later impulse response terms, or some of them.

In block 314 is formed a survivor path by adding the symbol sequence obtained on the basis of the transition metric to the survivor path formed so far. A survivor path is the path entering a decision state that provides the smallest path metric, i.e. the path in which the sum of the squared Euclidean distances or the sum of the Hamming distances, for example, is the smallest.

When the search for the symbol sequence is not yet complete, i.e. there are still states left in the trellis diagram, for example, the transition metric determined as described above is added to the previously formed path metric, or, if the path metric is to be kept in line with the originally selected metric, such as the sum of the squared Euclidean distances or the sum of the Hamming distances, the transition metric according to the improved search metric is used only for selecting the survivors, and a transition metric calculated using a prior art method is added to the path metric. Only the survivors are stored in the memory for the next decision state.

The above described transition metrics determined using the improved search method and transition metrics determined using a prior art method can also be combined to determine the path metric. The path metric then comprises transition metrics some of which are determined according to the prior art and the other according to the improved method. For example, the path metric is first calculated according to the prior art and then according to the improved method. The path metric terms, or some of them, may also be weighted averages.

The execution of the method continues until the entire symbol sequence searched for is found. Then, if reception continues, the search for a new symbol sequence begins.

Arrow 316 illustrates the reproducibility of the method whenever a new impulse response is to be determined. Arrow 318 illustrates the reproducibility of the method for a following sample value taken from the received signal, without the impulse response being determined again. The method can be repeated also by sampling a signal and leaving the channel impulse response undetermined. The execution of the method ends in block 320. It is to be noted that in the above formulas (1)-(9), the impulse response values are usually estimates, not exact values.

Figure 5A:
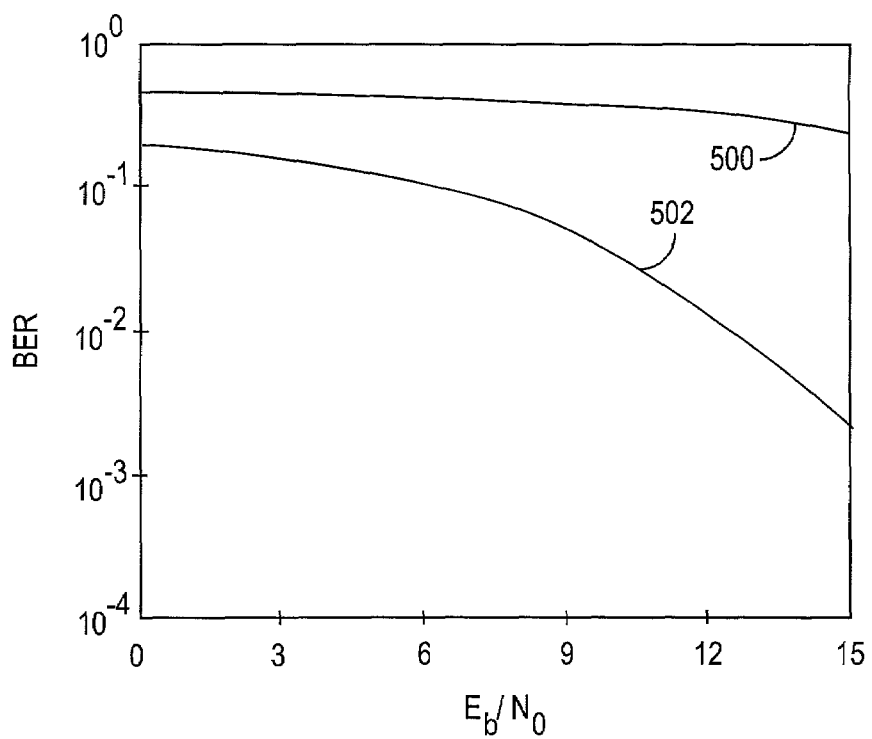
FIGS. 5a-b show simulation results of the channels of FIGS. 4a-b.
Figure 5B:
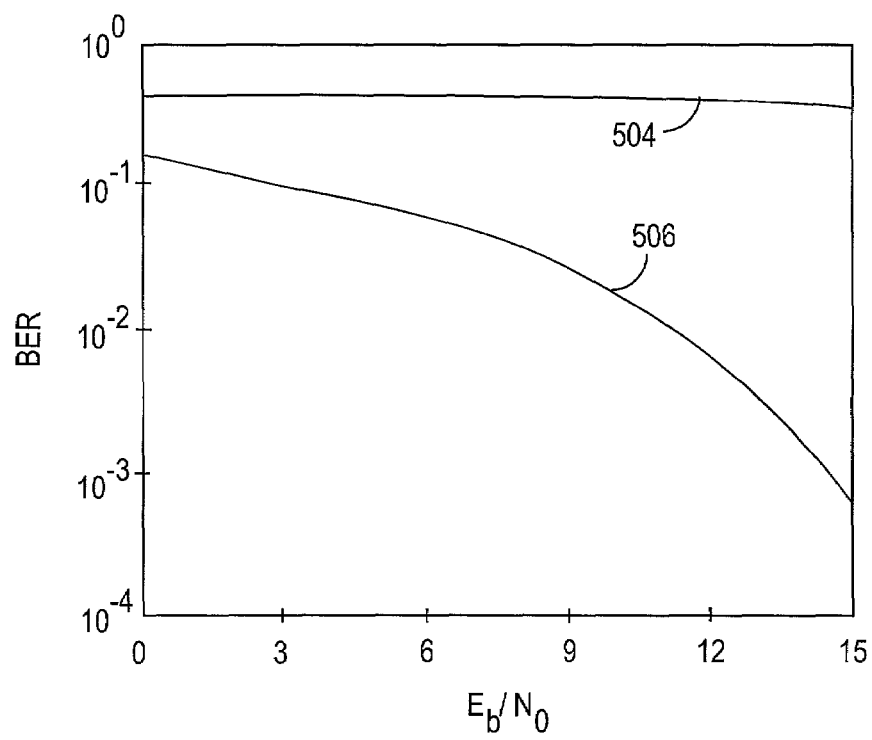

The examples show that the transition metrics are usually more complex than the prior art metrics, but this is compensated for by the absence of the prefilter and by the greater probability of the found symbol sequence to be the correct one, i.e. improved performance. FIGS. 5a-b show, by way of example, results of simulations relating to the channel examples of FIGS. 4a-b. It is to be noted that the applied modulation method and algorithm as well as the number of bits used in the simulation also have an effect on the individual simulation results. The simulation results illustrate, however, general tendencies in the system behaviour.

FIG. 5a shows simulated bit error ratio curves based on the channel example of FIG. 4a. FIG. 5b shows simulated bit error ratio curves based on the channel example of FIG. 4b. Bit error ratio is the number of incorrect bits to all bits, bit error ratios illustrating the performance of the system. The vertical axis represents the bit error ratio and the horizontal axis the ratio of bit energy to the power density of noise, which illustrates the signal-to-noise ratio. Curves 500 and 504 are based on the prior art and curves 502 and 506 on the improved transition metric. FIGS. 5a-b show that there is a significant difference in the performances in favour of the improved transition metric, particularly when high signal-to-noise ratio values are concerned. It is to be noted that in the situation shown in FIG. 4b in particular, where the value of the second impulse response is significantly higher than the value of the first impulse response, the improved metric offers clearly better performance than the prior art metric.

In the following, an example of a receiver structure will be described with reference to the block diagram of FIG. 6 where the improved search method is applied to channel equalization. The receiver may be located for example at a base station or in a subscriber terminal. The example of FIG. 6 shows only the channel equalizer and associated parts of the transmitter. It is apparent to a person skilled in the art that the transmitter usually comprises also other parts than those shown in FIG. 6. These parts are not shown here because they are not essential for describing the example. In addition, the transmitter parts vary according to the radio system standard applied. For example, systems based on spread spectrum technology comprise means for spreading the signal to be transmitted and means for despreading the signal to be received.

The information sequence to be transmitted x(n) 600 is supplied to a transmitter 602 and further relayed to an antenna or antenna group 604 for transmission to the radio path. The transmitter is implemented using a prior art solution. The execution of the method does not restrict the method selected for implementing the transmitter. The signal is then received by the receiver's antenna or antenna group 606, the received signal being then relayed to the receiver's radio frequency parts 608 where undesired frequencies are typically filtered from the received signal and the received signal is down-converted to an intermediate frequency or directly to baseband. The signal is sampled using sampling means 610 preferably at a symbol rate, a discrete analog signal r(n) 612 being thereby obtained which can be modeled for example as follows:

$$r(n) = \sum_{k=0}^{K} \hat{h}(k)x(n-k) + w(n), \text{ where} \quad (10)$$

w(n) is the channel noise term.

A channel estimator 616 is used according to a prior art method for determining the channel impulse response values, which are typically estimates, not exact values. These impulse response estimate values $\hat{h}(0), \hat{h}(1) \ldots, \hat{h}(K)$ 618 are supplied to a detector 614 where signal samples r(n) 612 are also supplied to. The detector 614 employs the above described improved search method to determine, in this case, a symbol sequence estimate $\hat{x}(n)$ 620 that contains the fewest errors by means of transition metrics and/or path metrics.

The invention is preferably implemented by software, in which case the base station or subscriber terminal, for example, comprises a microprocessor in which the software executing the functions of the described method is run. The invention can also be implemented for example by means of hardware solutions offering the required functionality, such as ASIC (Application Specific Integrated Circuit), or by means of discrete logic components.

It is to be noted that the described improved search method for searching for a symbol sequence is not only applicable for use in the channel equalizer structure shown in this example, but in all operations employing trellis or tree search algorithms or suboptimal algorithms based on these.

Although the invention is described above with reference to an example according to the accompanying drawings, it is apparent that the invention is not restricted to it, but may vary in many ways within the inventive idea disclosed in the claims.

I claim:

1. A suboptimal method for searching for a symbol sequence, comprising:
   determining a channel impulse response;
   sampling a received signal;
   selecting at least one of the highest and/or most reliable impulse response values;
   determining a reference signal using the at least one impulse response value and a symbol sequence assumed as transmitted;
   determining differential terms corresponding to the selected impulse response values for a sample of the received signal and the reference signal;
   applying the determined differential terms to a symbol sequence transition metric for searching for the symbol sequence;
   forming a survivor path by adding the symbol sequence provided by the transition metric to the survivor path formed so far.

2. A method according to claim 1, wherein at least one reference signal is determined using the selected impulse response value and at least one later impulse response value.

3. A method according to claim 1, wherein at least one reference signal is determined using only the selected impulse response value.

4. A method according to claim 1, wherein a number of differential terms for the transition metric is increased, when the impulse response comprises a plural number of high and/or most reliable values.

5. A method according to claim 1, wherein a number of differential terms for the transition metric is decreased, when the impulse response contains only some high and/or most reliable values or only one high and/or reliable value.

6. A method according to claim 1, wherein a highest possible number of differential terms for the transition metric is determined on the basis of a length of the channel memory.

7. A method according to claim 1, wherein a magnitude of the impulse response values is emphasized in the selection of differential terms for the transition metric.

8. A method according to claim 1, wherein the reliability of the impulse response values is emphasized in the selection of the differential terms for the transition metric.

9. A method according to claim 1, wherein the differential term illustrates a squared Euclidean distance between the received signal sample and the symbol sequence assumed as transmitted and convoluted with the impulse response values.

10. A method according to claim 1, wherein the differential term illustrates a squared Hamming distance between the received signal sample and the symbol sequence assumed as transmitted and convoluted with the impulse response values.

11. A method according to claim 1, wherein the differential term illustrates a correlation between the received signal sample and the symbol sequence assumed as transmitted and convoluted with the impulse response values.

12. A method according to claim 1, wherein the determined transition metric is added to the survivor path formed so far.

13. Computer software according to claim 1, which comprises routines for executing the method steps.

14. A computer memory means according to claim 13, which comprises the computer software.

15. A receiver in which a symbol sequence is searched for, the receiver comprising:
means for determining a channel impulse response,
means for sampling a received signal;
means for selecting at least one of the highest and/or most reliable impulse response values;
means for determining a reference signal using the at least one impulse response value and a symbol sequence assumed as transmitted;
means for determining differential terms corresponding to the selected impulse response values for a sample of the received signal and the reference signal;
means for using the determined differential terms in a transition metric for searching for the symbol sequence;
means for forming a survivor path by adding the symbol sequence provided by the transition metric to the survivor path formed so far.

16. A receiver according to claim 15, wherein at least one reference signal is determined using the selected impulse response value and at least one later impulse response value.

17. A receiver according to claim 15, wherein at least one reference signal is determined using only the selected impulse response value.

18. A receiver according to claim 15, wherein a number of differential terms for the transition metric is increased, when the impulse response comprises a plural number of high and/or most reliable values.

19. A receiver according to claim 15, wherein a number of differential terms for the transition metric is decreased, when the impulse response comprises only some high and/or most reliable values, or only one high and/or most reliable value.

20. A receiver according to claim 15, wherein a maximum number of differential terms for the transition metric is determined by a length of the channel memory.

21. A receiver according to claim 15, wherein a magnitude of the impulse response values is emphasized in the selection of differential terms for the transition metric.

22. A receiver according to claim 15, wherein the reliability of the impulse response values is emphasized in the selection of differential terms for the transition metric.

23. A receiver according to claim 15, wherein the differential term illustrates a squared Euclidean distance between the received signal sample and the symbol sequence assumed as transmitted and convoluted with the impulse response values.

24. A receiver according to claim 15, wherein the differential term illustrates a Hamming distance between the received signal sample and the symbol sequence assumed as transmitted and convoluted with the impulse response values.

25. A receiver according to claim 15, wherein the differential term illustrates a correlation between the received signal sample and the symbol sequence assumed as transmitted and convoluted with the impulse response values.

26. A receiver according to claim 15, wherein the determined transition metric is added to the survivor path formed so far.

27. A receiver configured to:
determine a channel impulse response;
sample a received signal;
select at least one of the highest and/or most reliable impulse response values;
determine a reference signal using the at least one impulse response value and a symbol sequence assumed as transmitted;
determine differential terms corresponding to the selected impulse response values for a signal sample obtained by sampling the received signal and the reference signal;
use the determined differential terms in a transition metric for searching for a symbol sequence;
form a survivor path by adding the symbol sequence provided by the transition metric to the survivor path formed so far.

28. A receiver according to claim 27, wherein the maximum number of differential terms for the transition metric is determined by the length of the channel memory.

29. A receiver according to claim 27, wherein the differential term illustrates the squared Euclidean distance between the received signal sample and the symbol sequence assumed as transmitted and convoluted with the impulse response values.

30. A receiver according to claim 27, wherein the differential term illustrates the Hamming distance between the received signal sample and the symbol sequence assumed as transmitted and convoluted with the impulse response values.

31. A receiver according to claim 27, wherein at least one reference signal is determined using the selected impulse response value and at least one later impulse response value.

32. An apparatus configured to:
determine a channel impulse response;
sample a received signal;
select at least one of the highest and/or most reliable impulse response values;
determine a reference signal using the at least one impulse response value and a symbol sequence assumed as transmitted;

determine differential terms corresponding to the selected impulse response values for a signal sample obtained by sampling the received signal and the reference signal;

use the determined differential terms in a transition metric for searching for a symbol sequence;

form a survivor path by adding the symbol sequence provided by the transition metric to the survivor path formed so far.

33. An apparatus according to claim 32, wherein the maximum number of differential terms for the transition metric is determined by the length of the channel memory.

34. An apparatus according to claim 32, wherein at least one reference signal is determined using the selected impulse response value and at least one later impulse response value.

* * * * *